United States Patent
Fisher et al.

(10) Patent No.: US 12,083,462 B2
(45) Date of Patent: Sep. 10, 2024

(54) METHOD AND APPARATUS FOR SEPARATING GAS FROM LIQUID

(71) Applicant: DRYLINE TECHNOLOGIES LP, Katy, TX (US)

(72) Inventors: Michael Edmund Fisher, Katy, TX (US); Brandon Edward Carringer, Houston, TX (US)

(73) Assignee: Dryline Technologies LP, Katy, TX (US)

(*) Notice: Subject to any disclaimer, the term of this patent is extended or adjusted under 35 U.S.C. 154(b) by 54 days.

(21) Appl. No.: 17/802,085

(22) PCT Filed: May 20, 2021

(86) PCT No.: PCT/US2021/033354
§ 371 (c)(1),
(2) Date: Aug. 24, 2022

(87) PCT Pub. No.: WO2021/236905
PCT Pub. Date: Nov. 25, 2021

(65) Prior Publication Data
US 2023/0078731 A1    Mar. 16, 2023

Related U.S. Application Data

(60) Provisional application No. 63/028,955, filed on May 22, 2020.

(51) Int. Cl.
*B01D 50/00* (2022.01)
*B01D 45/08* (2006.01)
(Continued)

(52) U.S. Cl.
CPC ............ *B01D 45/08* (2013.01); *B01D 45/16* (2013.01); *B01D 46/0005* (2013.01); *B01D 50/00* (2013.01)

(58) Field of Classification Search
CPC .... B01D 19/00; B01D 19/0042; B01D 50/00; B01D 46/0005
See application file for complete search history.

(56) References Cited

U.S. PATENT DOCUMENTS

| | | |
|---|---|---|
| 2005/0060970 A1 | 3/2005 | Polderman |
| 2006/0062699 A1 | 3/2006 | Evenstad |

(Continued)

FOREIGN PATENT DOCUMENTS

| | | | |
|---|---|---|---|
| CN | 208389620 U | * | 1/2019 |
| CN | 209083276 U | * | 7/2019 |

(Continued)

OTHER PUBLICATIONS

Search Report and Written Opinion for Int'l App. No. PCT/CA2014/050695 dated Sep. 13, 2021, 8 pages.

(Continued)

*Primary Examiner* — Robert A Hopkins
(74) *Attorney, Agent, or Firm* — Locke Lord LLP (57) ABSTRACT

A gas and liquid separator includes a wet gas feedstock ingress, a plurality of separating baffles, a dried gas egress, and a first liquid egress. A wet gas feedstock under pressure enters the separator through the wet gas feedstock ingress. The wet gas feedstock ingress adiabatically and isentropically converges the wet gas feedstock and then accelerates the wet gas feedstock into the separation baffles. The separation baffles separate the constituents of the wet gas feedstock. The separated, dry gas egresses the separator through a straw of the dried gas egress that extends into the interior of a separation chamber of the separator from the top thereof. The separated liquids egress from the separator through the first liquid egress.

24 Claims, 8 Drawing Sheets

(51) Int. Cl.
  *B01D 45/16* (2006.01)
  *B01D 46/00* (2022.01)

(56) References Cited

U.S. PATENT DOCUMENTS

2009/0020467 A1   1/2009  Parkinson
2018/0363979 A1  12/2018  Shaikh

FOREIGN PATENT DOCUMENTS

CN    209584136 U   *  11/2019
WO    2016004504 A1    1/2016

OTHER PUBLICATIONS

Zhang et al., Experimental Research and Numerical Simulation on Gas-Liquid Separation Performance at High Gas Void Fraction of Helically Coiled Tube Separator, International Journal of Chemical Engineering, vol. 2014, Article ID 674925, 9 pages.

* cited by examiner

FIG. 9

METHOD AND APPARATUS FOR SEPARATING GAS FROM LIQUID

CROSS-REFERENCE TO RELATED APPLICATIONS

This application is a 371 of PCT Application No. PCT/US2021/033354 filed on May 20, 2021, which claimed the benefit of co-pending U.S. Provisional Application Ser. No. 63/028,955, filed May 22, 2020, in the name of Michael Edmund Fisher and Brandon Edward Carringer as inventors, entitled, "Method and Apparatus for Separating Gas from Liquid", under 35 U.S.C. § 119 (e). This provisional application and the PCT Application are hereby incorporated by reference for all purposes as if set forth herein verbatim.

STATEMENT REGARDING FEDERALLY SPONSORED RESEARCH OR DEVELOPMENT

Not applicable.

BACKGROUND

This section of this document introduces various information from the art that may be related to or provide context for some aspects of the subject matter described herein and/or claimed below. It provides background information to facilitate a better understanding of that which is disclosed and claimed herein. As such, this is a discussion of "related" art. That such art is related in no way implies that it is also "prior" art. The related art may or may not be prior art. The discussion in this section is to be read in this light, and not as admissions of prior art.

Hydrocarbons extracted from the ground typically contain a mixture of liquids, gasses, and particulates. For example, a natural gas well might yield a production stream of natural gas in which various liquids, known as "free liquids", may be found. Examples of such free liquids include water, brine, kerosene, oils, condensate, ethylene glycol ("MEG"), drilling fluids, etc. The production stream may also include particulates, such as sand or other sediments.

The production stream moves under pressure through a series of lines for collection and processing. The production stream may encounter a variety of equipment in the course of its movement that serve one purpose or another. Different components of equipment of different types may be utilized depending on the end use of the production stream. In the context of a natural gas well production stream, the free liquids and particulates can damage the equipment. Over time, the damage may accumulate to a point where repair or replacement of one or more components of the equipment may be needed.

The presently disclosed technique is directed to resolving, or at least reducing, one or all of the problems mentioned above. Even if acceptable solutions are available to the art to address these issues, the art is always receptive to improvements or alternative means, methods, and configurations. Thus, there exists a need for a technique such as that disclosed and claimed herein.

SUMMARY

In a first aspect, a gas and liquid separator, comprises: a shell adapted to be vertically oriented in use, the shell defining a separating chamber having an interior diameter and having a top end and a bottom end; a wet gas feedstock ingress to the separating chamber disposed at the bottom end of the shell, the wet gas feedstock ingress including a de Laval nozzle and the wet gas feedstock including at least one of a plurality of gaseous mixtures, a plurality of condensable vapors, and a liquid; a plurality of separating baffles disposed within the separating chamber above the wet gas feedstock ingress to separate the gaseous mixtures from the condensable vapors and liquid; a dried gas egress disposed at the top end of the shell for the separated gaseous mixtures above the first liquid egress and the separating baffles, the dried gas egress including a straw extending into an interior portion of the separating chamber and terminating above the separating baffles; and a first liquid egress from the separating chamber.

In a second aspect, a gas and liquid separator, comprises: a shell adapted to be vertically oriented in use, the shell defining a separating chamber having an interior diameter and having a top end and a bottom end; a plurality of separating baffles disposed within the separating chamber; ingress means disposed at the bottom end of the shell for: ingressing a wet gas feedstock including at least one of a plurality of gaseous mixtures, a plurality of condensable vapors, and a liquid to the separating chamber; adiabatically and isentropically converging the wet gas feedstock as the wet gas feedstock ingresses; accelerates the adiabatically and isentropically converged wet gas feedstock, including condensing the condensable vapors to condensed vapors; and directs the accelerated feedstock into the separating baffles to separate the gaseous mixtures from the condensed vapors and the liquid; dried gas egress means disposed at the top end of the separating chamber for separated gaseous mixtures to egress from an interior portion of the separating chamber above the separating baffles; and a first liquid egress from the separating chamber for the separated liquid.

In a third aspect, a method for separating gas from liquid in a wet gas feedstock, the method comprising: ingressing a wet gas feedstock containing a including at least one of a plurality of gaseous mixtures, a plurality of condensable vapors, and a liquid into a separating chamber, including: adiabatically and isentropically converging the wet gas feedstock as the wet gas feedstock ingresses; accelerating the adiabatically and isentropically converged wet gas feedstock, including condensing the condensable vapors to condensed vapors; and directing the accelerated feedstock into the separating baffles to separate the gaseous mixtures from the condensed vapors and the liquid; separating the gaseous mixtures from the condensed vapors and the liquid in the separating chamber; egressing the separated gaseous mixtures from an interior portion of the separating chamber; and draining the separated liquid and the condensed vapors from the separation chamber.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements.

While different embodiments of this disclosure are susceptible to various modifications and alternative forms, the drawings illustrate specific embodiments herein described in detail by way of example. It should be understood, however, that the description herein of specific embodiments is not intended to limit this disclosure to the particular forms disclosed, but on the contrary, the disclosed embodiments may be varied to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The subject matter claimed below will now be described with reference to the attached figures. Various structures, systems and devices are schematically depicted in the drawings for purposes of explanation only and so as to not obscure the claimed subject matter with details that are well known to those skilled in the art. Nevertheless, the attached drawings are included to describe and explain illustrative examples shown therein.

Figure 1:
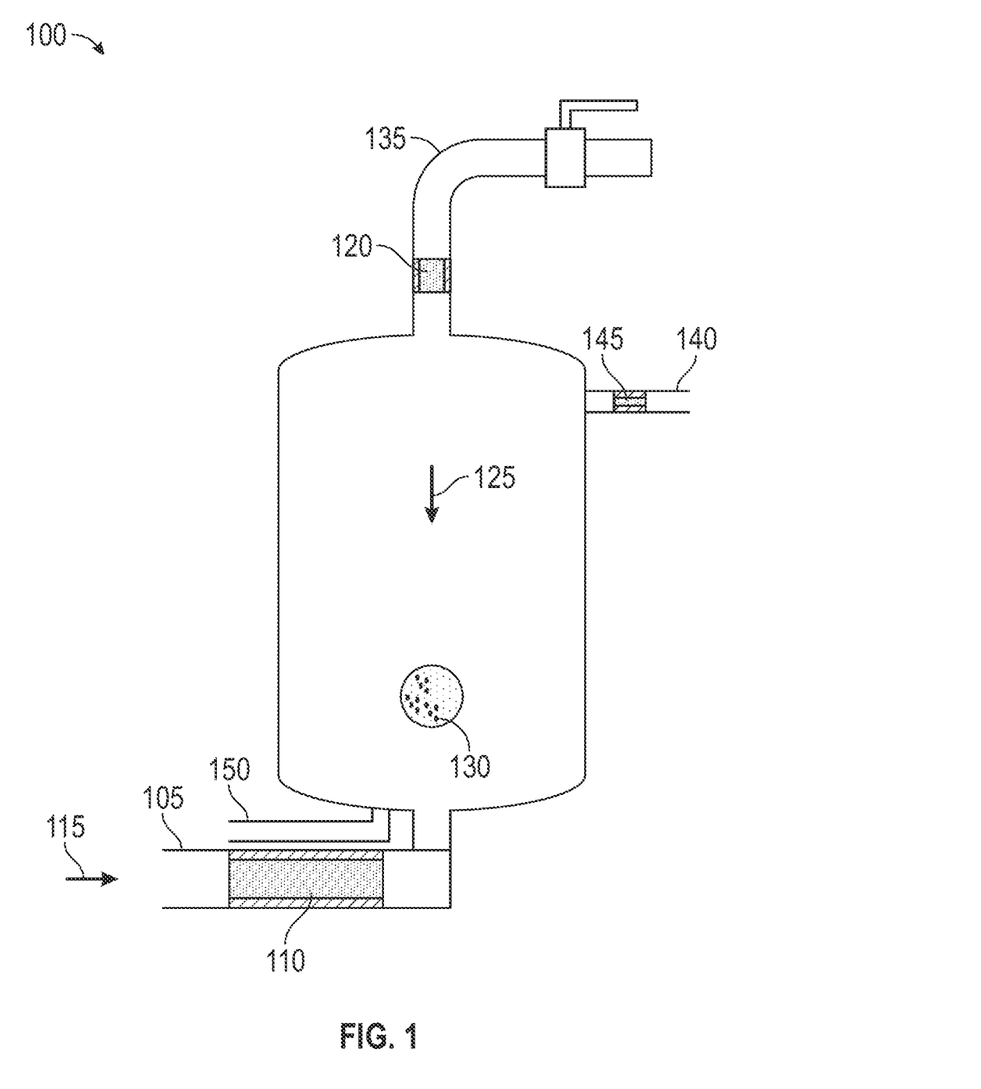
FIG. 1 is a conceptualized illustration of a separator in accordance with the techniques described herein in which the separator is shown in a plan view.

Turning to FIG. 1, a separator 100 in accordance with the techniques described herein is shown in a plan, partially sectioned view for a conceptualized illustration. The separator 100 is shown installed on a line 105 in a manner described more fully below. The line 105 is a part of a gas wellhead not otherwise shown. The line 105 carries a wet gas feedstock 110 traveling (e.g., flowing) from left to right in the drawing as indicated by the arrow 115. The wet gas feedstock 110 includes, as is described above, gas, free liquids, and particulates in the form of at least one of a plurality of gaseous mixtures, a plurality of condensable vapors, and a liquid, none of which as separately shown. More particularly, A liquid state of matter is not a requirement at the ingress. It is possible to have a liquid, but a dual phase flow stream is not necessary at the ingress (or three phase for solid particulates in the flow stream).

The wet gas feedstock is, in this particular embodiment, obtained from a natural gas well. Accordingly, the gas is natural gas. The free liquids might therefore be, for example, brine or water and the particulates some kind of sediment. However, those in the art, having the benefit of this disclosure, will appreciate that the separator disclosed herein will have applications outside of the context of hydrocarbon wells. Thus, the identity of the gas, free liquids, and particulates will be a function of the context in which the separator 100 is used.

The separator 100 separates the wet gas feedstock 110 into constituent parts in a manner described more fully below to obtain a separated gas 120 and a separated liquid 145. The wet gas feedstock 110 includes at least one of a plurality of gaseous mixtures, a plurality of condensable vapors, and a liquid. In some embodiments, including the illustrated embodiment, particulates 130 may also be separated. The separator 100 is mechanically coupled to a separated gas line 135 and a first separated liquid line 140 through which the separated gas 120 and separated liquid 145, respectively, egress the separator 100.

The illustrated embodiment is also mechanically coupled to a second separated liquid line 150. The second separated liquid line 150 can drain separated liquid 145 that falls downward (indicated by the arrow 125) through separator 100 as well as separated particulates 130, if any. Some embodiments not shown may omit either the first separated liquid line 140 or the second separated liquid line 150. Still other embodiments may locate the drain lines(s) at different locations on the separator 100.

In the illustrated embodiment, the first separated liquid line 140 and the second separated liquid line 150 feed a single repository (e.g., an exterior reservoir) that is not shown. The continuity between the first separated liquid line 140 and the second separated liquid line 150 thus serves as a recirculatory system to draw the condensed, separated liquids into the liquid repository. However, this feature may be omitted in some embodiments.

Figure 2:
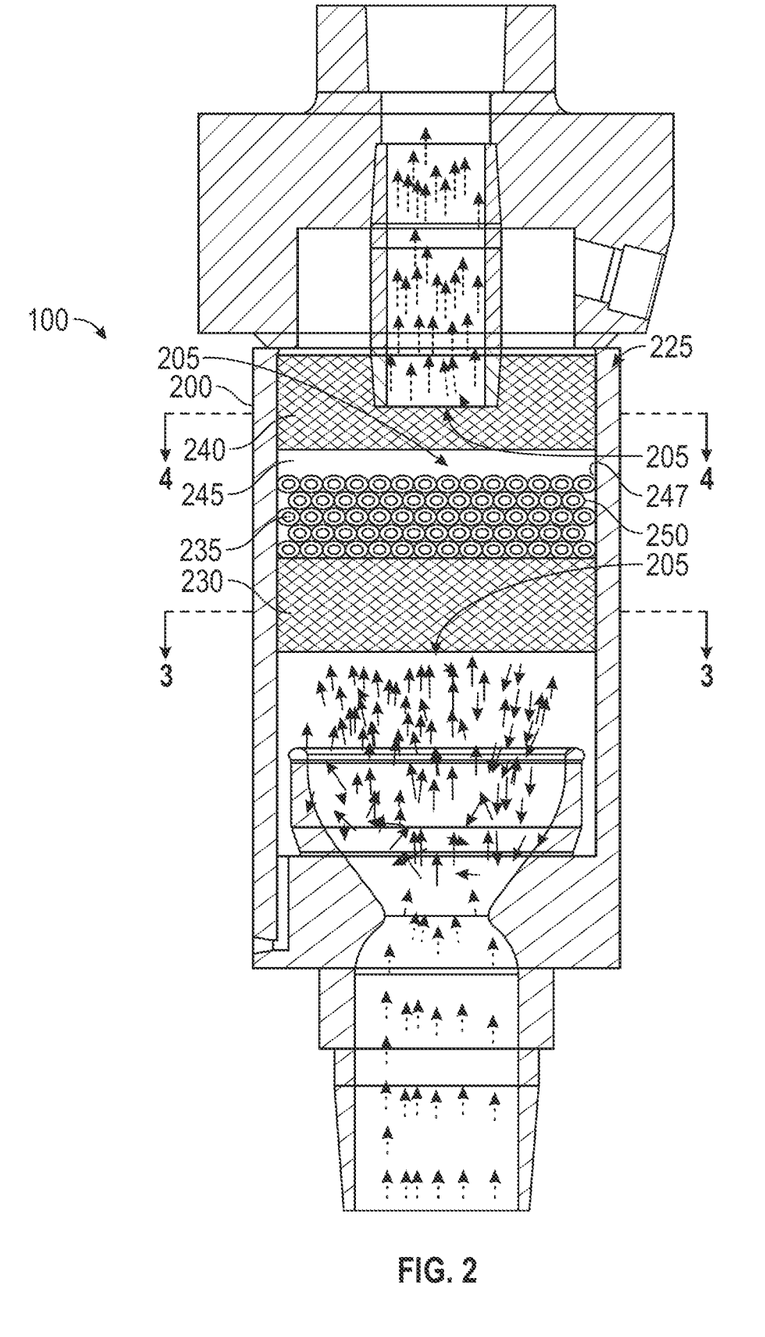
FIG. 2 illustrates a portion of the separator of FIG. 1 in isolation.

Referring now to FIG. 2, a portion of the separator 100 is shown in isolation and in a sectioned view. The separator 100 comprises a shell 200 adapted to be vertically oriented in use. The shell 200 defines a separation chamber 205 in which are disposed three permeable, fluid flow barriers 230, 235, 240, all within the shell 200. These permeable fluid flow barriers may collectively be referred to as "separating baffles". The first permeable, fluid flow barrier 230 is located at the bottom end 220 proximate the wet gas feedstock ingress (discussed below) and comprises a first medium. The second permeable, fluid flow barrier 235 is located atop and proximate to the first barrier 230 and comprises a second medium. The third permeable, fluid flow barrier 240 is disposed within the shell 200 at the top end 225 thereof proximate the dried gas egress (also discussed below) and comprises the first medium as well. The third barrier 240 is disposed such that there is a gap 245 between the second and third barriers 235, 240.

Figure 3:
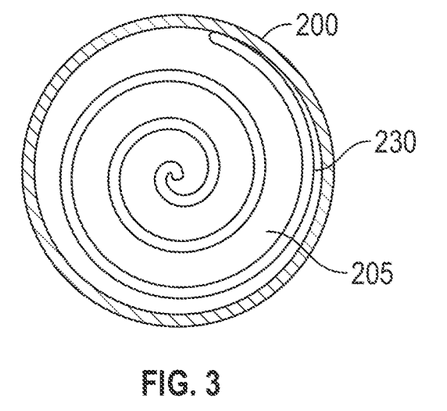
FIG. 3 is a cross-section of the separator of FIG. 1-FIG. 2 taken along line 3-3 in FIG. 2.
Figure 4:
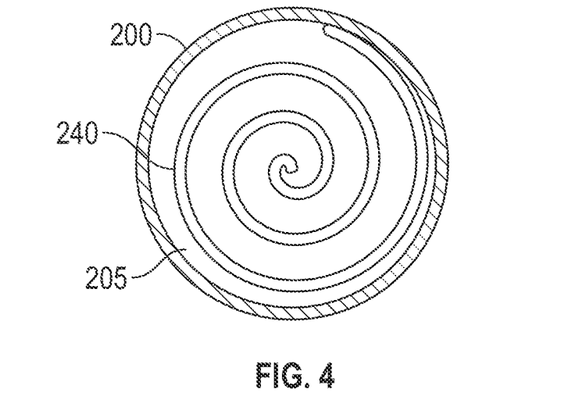
FIG. 4 is a cross-section of the separator of FIG. 1-FIG. 2 taken along line 4-4 in FIG. 2.

Referring now to FIG. 2 in conjunction with FIG. 3-FIG. 4, the first and third barriers 230, 240 are, in this particular embodiment, "mist pads". The first medium from which they are constructed is a woven metal mesh wound about a central point and then inserted into the shell 200 as better shown in FIG. 3 and FIG. 4. In some embodiments, the wound mesh is then positioned within the separation chamber 205 and is held in position by a friction fit between the mesh and the wall 247 of the separation chamber 205 and then welded. Some embodiments may use a rolled sleeve (such as a single ply of roof flashing) (not shown) to axially support the lower "mist pad" in place along the longitudinal axis of the shell 200. Furthermore, alternative to welding, epoxy or adhesive can serve the purpose without compromising the "as supplied" state of the shell 200.

The size of the openings in the mesh of the first medium will be a function of the materials to be separated. The openings should be large enough to separate the constituent gas, free liquid, and particulates (if any) as described below without unduly hampering flow through the barriers 230, 240. Determining the proper sizing for any given wet gas feedstock may be accomplished, among other techniques, by using a function of trial and error testing. As noted above, the illustrated embodiment is designed for use with natural gas production streams. The mesh is therefore a 9 # mesh.

The length and the width of the mesh and the tightness of the wind is a function of a number of factors. These factors include not only address the goal of separating the constituents, but also take into consideration the mesh that is available, the pressure under which the wet gas feedstock 110 enters the separator 100, and the inner diameter of the separation chamber 205, among others. In the illustrated embodiment, the 9 # mesh is a 27" long by 6" wide strip wound sufficiently to be inserted into the 2" wide chamber and maintain a friction fit until welded. Thus, the height of the first and third barriers 230, 240 in FIG. 1-FIG. 2 is 6" and the diameter of the separation chamber 205 is 2" in the illustrated embodiment.

The materials from which the mesh is constructed admits variation as well. In general, such meshes are manufactured as an expanded metal. Although this is not required, it may influence a given embodiment. The elements of the wet gas feedstock 110 are typically corrosive and, as mentioned above, include free liquids. The material should also therefore be selected to resist rust and corrosion. They should also be sufficiently ductile so that the winding does not compromise the integrity of the mesh and, when wound, have sufficient spring to make and keep the friction fit during manufacture.

Suitable materials for the mesh in various embodiments may include, ceramic, plastic, metals, etc. In certain embodiments, the mesh composition may be constructed of coated filaments, filaments made of a plurality of metallic anisotropic bonded layers, filaments made of a plurality of electroplated materials, filaments made of a plurality of nonmetallic bonded layers, or a plurality of interwoven unique filament materials, or combinations thereof, for example. In certain embodiments a mesh may be woven, expanded, perforated, welded, etc. Still other embodiments may implement the mesh differently than is described herein.

As mentioned above, the second barrier 235 is comprised of a second medium that is different from the first medium. In the illustrated embodiment, this second medium is a random packing in the form of a plurality of Raschig rings, also known as "pall rings". Pall rings are known to the art, and the illustrated embodiment uses ⅝" pall ring available from AMACS Separation Products, Inc. One such pall ring 500 is shown in FIG. 5.

Pall rings are designed to induce a pressure drop and flow disruption in fluid flow. According to the manufacturer AMACS, the particular pall ring design used in the illustrated embodiment minimizes contours and crevices that might cause liquid hold-up and entrainment while providing the gas and liquid transfer rates. This pall ring includes opened cylinder walls 505 defining openings 510 therein and bent protrusions 515 to relatively increase capacity and lower pressured drops relative standard Raschig rings. The openings also help maintain even distribution and resist wall-channeling tendencies. The contacting surfaces of the walls 505 and protrusions 515 also provide effective distribution of liquids and gasses, while resisting plugging fouling and nesting.

While the present embodiment uses pall rings, other embodiments may use other types of Raschig rings as are known to the art. Such rings may be injection molded plastics, molded ceramics, or press-formed from metal sheet. As with the mesh, materials selection should be considered while taking into consideration the wet and corrosive nature of the materials being separated. In the illustrated embodiment, the pall rings 500 are fabricated of 316L stainless steel and are ⅝" in size, although other materials may be used in alternative embodiments.

Figure 5:
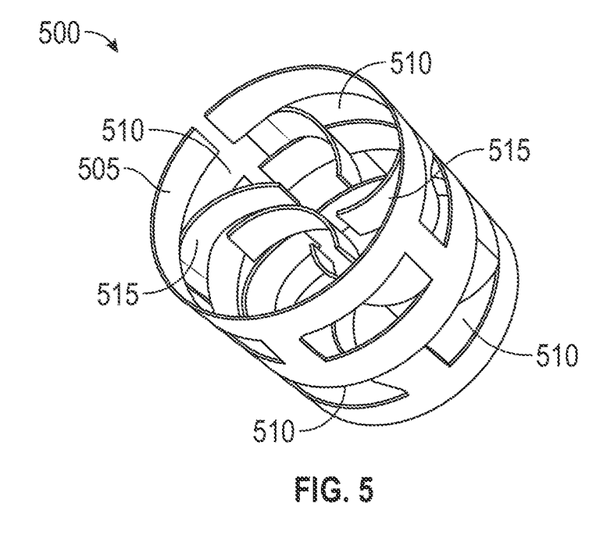
FIG. 5 illustrates one example of a pall ring used in one particular embodiment of the separator of FIG. 1-FIG. 2.

Referring back to FIG. 2, there is included a conceptual illustration of the second, permeable fluid flow barrier 235 comprised of pall rings 250 (such as the pall rings 500 of FIG. 5). The pall rings 250 are shown stacked neatly atop first barrier 230 and uniformly oriented in the same direction. As random packing, this is unlikely to be the case in any given embodiment. The orientation of the pall rings 250 is not material and will most likely in fact be random in most embodiments.

One exception is that the pall rings 500 be placed and positioned to define the gap 245 between the second and third barriers. The gap 245 aids in creating the Bernoulli effect that separates the elements of the wet gas feedstock 110 in the manner described below. The gap 245 also allows the pall rings to move freely and help provide more efficient separation. The width of the gap 245 will also be a function of several factors such as the identity of the elements of the wet gas feedstock 110, the pressure under which the wet gas feedstock 110 enters the separator 100, and the inner diameter of the separation chamber 205, among others. In the illustrated embodiment, the gap 245 is approximately 2" tall.

Referring now to FIG. 2 through FIG. 5 collectively, the shell 200 can be supplied in any number of diameters and lengths and comprises the outer container of the separator 100. The first, second, and third permeable fluid flow barriers 230, 235, 240 components make up the filtering media. These can be supplied in numerous mesh sizes and surface areas depending on the required degree of sediment filtering required. In general, each of these components is commercially available and specifications for the materials and parts will be determined according to the end use of the separator 100 in any given embodiment.

Once the diameters lengths and filtering media requirements are determined, the components are assembled in the following order. The proper media for the third barrier 240 is fitted into the shell 200. The third barrier 240 engages the shell 200 through a friction fit that maintains the third barrier 240 in its position. The pall rings 250 are then placed inside the shell 200. The first barrier 230 is then fitted into the shell 200. The first barrier 230 also engages the shell 200 in a friction fit that maintains it in position. Note that the first barrier 230 is positioned so that the pall rings are free to move and to provide the gap 245. The fabricated separator is then hydrostatically tested for the specified pressure rating before blasting and painting for in field installation.

Figure 6:
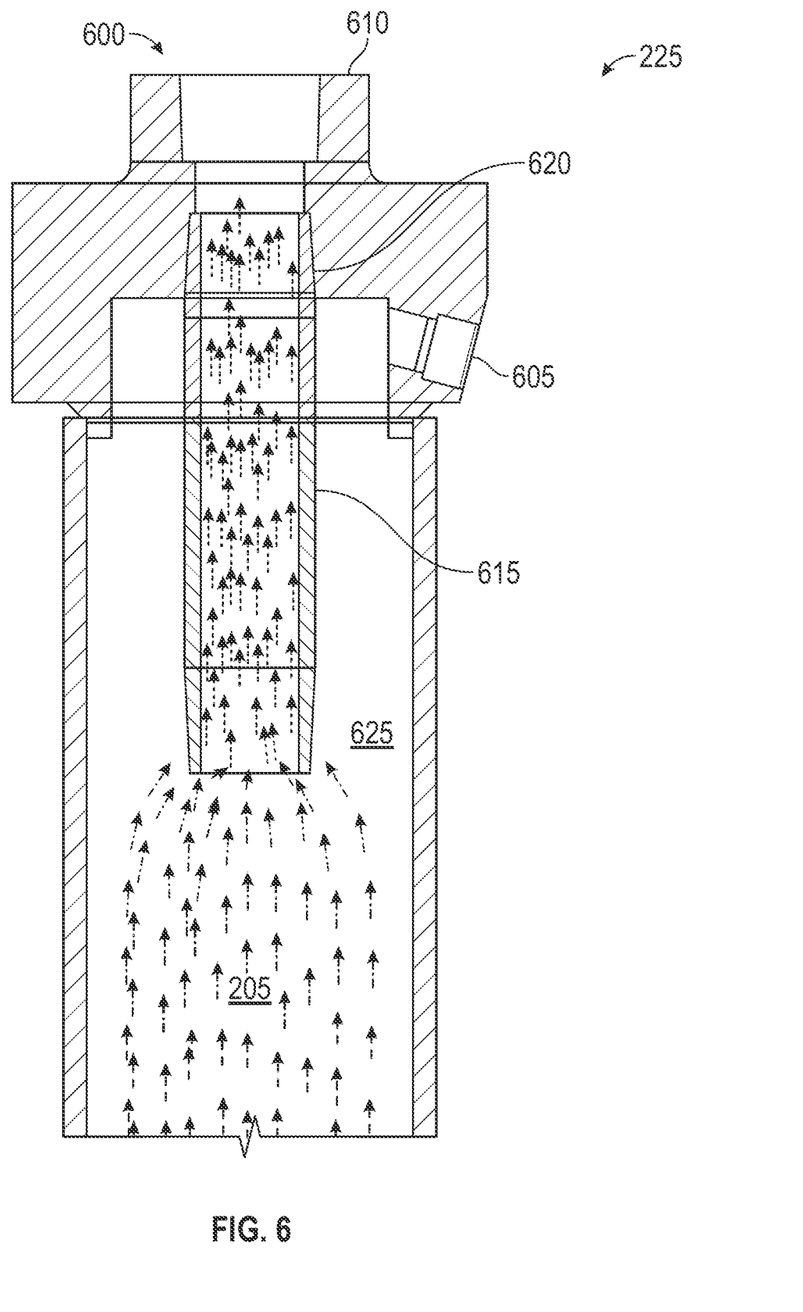
FIG. 6 illustrate one particular shell top for the separator of FIG. 1-FIG. 2 in a sectioned view, the shell top including a gas egress and a first liquid egress.
Figure 7A:
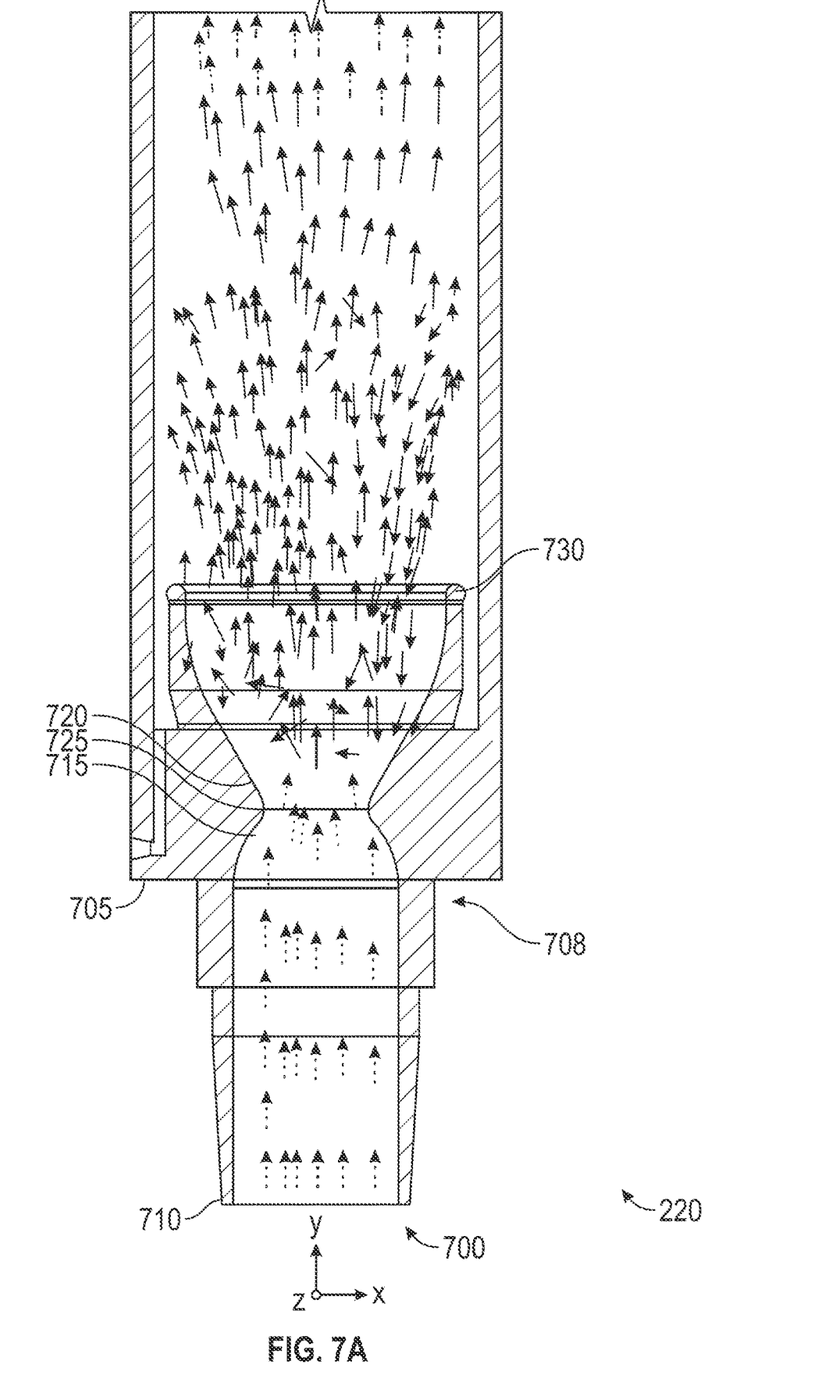
FIG. 7A illustrates one particular shell bottom for the separator of FIG. 1-FIG. 2 in a sectioned view, the shell bottom including a wet gas feedstock ingress.

The shell 200 defines not only a separation chamber 205, but a dried gas egress 600, shown in FIG. 6, and a wet gas feedstock ingress 700, shown in FIG. 7A. The fluid flow barriers 230, 235, 240 shown in FIG. 2 have been omitted in FIG. 6 and FIG. 7A for the sake of clarity. As indicated in FIG. 6 and FIG. 7A, the dried gas egress 600 is located at the top 225 of the shell 200 and the wet gas feedstock ingress 700 is locate at the bottom 220 of the shell 200. The structure and functionality of the dried gas egress 600 and wet gas feedstock ingress 700 will be discussed more fully below.

The top end 225 of the shell 200 also defines, as shown in FIG. 6, a first liquid egress 605 and a mechanical coupling 610. The first liquid egress 605 may include a thread (not shown) for a threaded, mechanical connection to the separated fluid line 140 shown in FIG. 1. The mechanical coupling 610 may also include a thread (also not shown) for a threaded, mechanical connection to the separated gas line 145, also shown in FIG. 1. As shown in FIG. 7A, the bottom end 220 of the shell 200 also defines a second liquid egress 705. The second liquid egress 705 may include a thread (not shown) for a threaded, mechanical connection to the second separated liquid line 150, shown in FIG. 1.

Referring now collectively to FIG. 1 and FIG. 6-FIG. 7A, while the illustrated embodiment may use threaded connections between the first liquid egress 605 and the separated fluid line 140, the second liquid egress 705 and the second separated liquid line 150, and the mechanical coupling 610 and the separated gas line 145, this is not necessarily so in all embodiments. Any suitable mechanical connection may be used so long as the connection is fluid tight and be durable. As noted above, some embodiments may omit one or the other of the first separated liquid line 140 and the second separated fluid line 150. In these embodiments, the unused first liquid egress 605 or unused second liquid egress 705 may be plugged. Alternatively, the unused first liquid egress 605 or unused second liquid egress 705 may be omitted altogether from the separator 100.

Turning now to FIG. 6, the dried gas egress 600 includes an extension, or "straw", 615 that extends from a dry gas egress port 620 in the shell 200 into the interior 625 of the separator 100. The wet gas feedstock ingress 700, shown in FIG. 7A and discussed further below, generates a turbulence at the bottom of the separator 100. As the separated gas and condensed fluids of the wet gas feedstock 110 travels under pressure through the permeable, fluid flow barriers 230, 235, 240, all shown in FIG. 2, the turbulence dissipates prior to the separated gas and condensed fluid reaching the straw 615. The straw 615 provides a path for the less dense "dry gas", or separated gas 120, to the egress port 620 where there is one phase flow (no condensed liquids).

Note that the straw 615 and dry gas egress port 620 are, by way of example and illustration, but one implementation of a dried gas egress means disposed at the top end 225 of the separating chamber 205 for separated gaseous mixtures to egress from an interior portion 625 of the separating chamber 200 above the separating baffles (e.g., the permeable fluid flow barriers 230, 235, 240). Other embodiments may employ other means having equivalent structure while performing the recited function.

Turning now to FIG. 7A, the wet gas feedstock ingress 700 includes a de Laval nozzle 708 installed in an ingress port 710 in the shell 200. The de Laval nozzle 708 includes a converging portion 715 and a diverging portion 720 joined at a neck 725, and so may also be called a converging/diverging nozzle. The de Laval nozzle 708 allows for a greater differentiation between the stagnation pressure and static pressure of the wet gas feedstock 110. This differentiation induces an increased mass rate of condensation of dispersed gasses (humidity or water vapor) into liquid condensate. The widening or divergence of the passage through the de Laval nozzle 708 after the neck 725 accelerates the wet gas feedstock 110 and directs it into the separating baffles. This improves the efficacy of the separation.

Figure 7B:
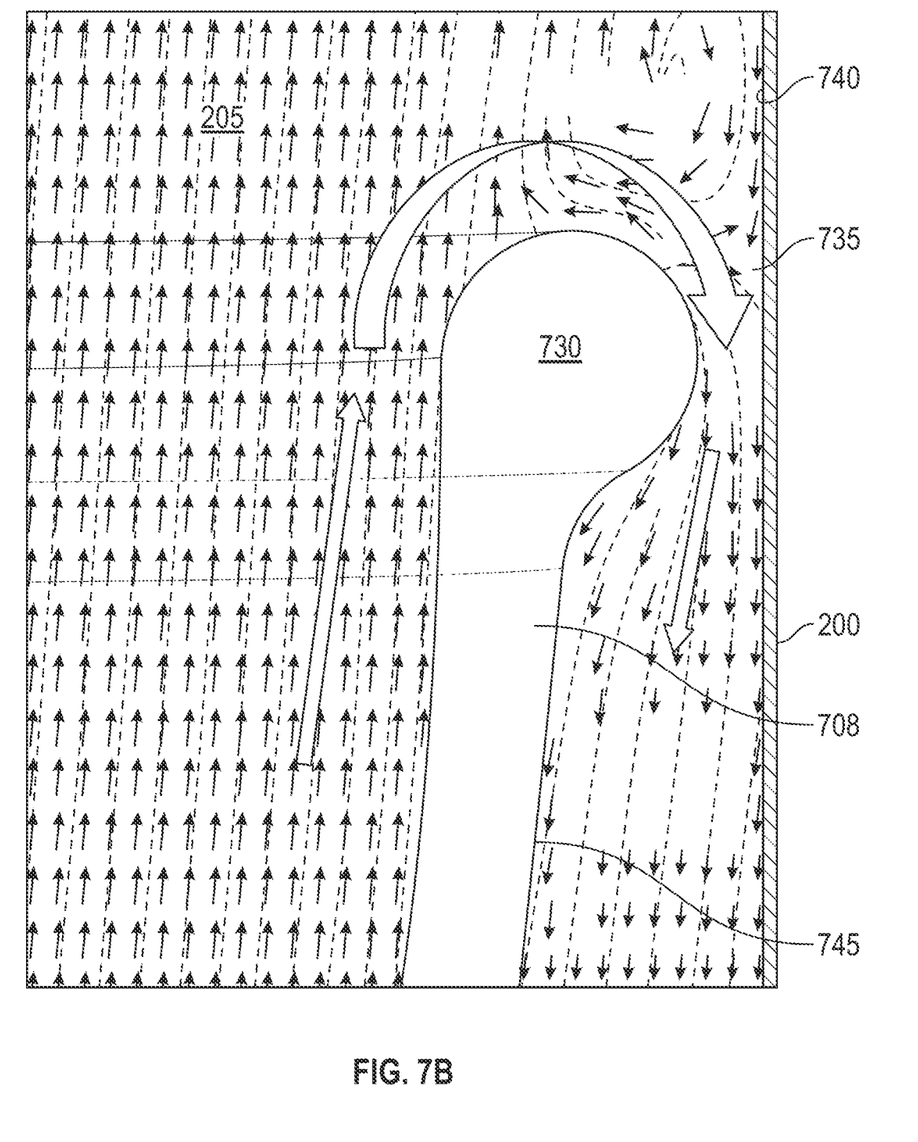
FIG. 7B illustrates pressure drop in the fluid flow between the tip of a de Laval nozzle in the inlet and an inner diameter of the shell.

More particularly, and referring now to FIG. 7B, the fluid flow past the nozzle tip 730 of the de Laval nozzle 708 causes a pressure drop in the annular area 735 between the de Laval nozzle 708 nozzle tip 730 (i.e., the "exit" of the de Laval nozzle 708) and the inner diameter 740 of the shell 200 in the separation chamber 205. In FIG. 7B, the arrows represent fluid flow and their density represents pressure. Thus, a greater concentration of arrows represents a higher pressure and a lower concentration represents a lower pressure. The pressure drop draws the liquid or condensed vapors to the liquid egress. For instance, if there is a solid precipitate (e.g., ice) deposition in the flow stream, it will naturally follow this path, but not as a liquid. In some embodiments, the nozzle tip 730 is close enough to the inner diameter 740 to create a vacuum in the nozzle/ID annular egress area, i.e., the annular area 735. Note that the slope of the outer surface 745 of the de Laval nozzle 708 away from the inner diameter 740 may influence the magnitude of the pressure drop.

Furthermore, and returning to FIG. 7A, the converging portion 715 of the de Laval nozzle 708 accelerates the fluid Mach number to 1 in an isentropic and adiabatic manner. Those in the art having the benefit of this disclosure will appreciate that the isentropic and adiabatic aspects will not be 100% isentropic and adiabatic. Some amount of energy will be lost to sources such as friction, etc. However, as a practical matter, the acceleration may be considered to be both isentropic and adiabatic. Note that the Mach number may vary depending on the application to which the apparatus is put. Mach number values of 1 or less may be valuable for separating water vapor from compressed air while other applications may utilize a Mach number greater than 1.

The Mach number of 1 is proportional to the temperature of the fluid. The ambient environmental conditions will alter the temperatures experienced at the nozzle throat of the neck 725 with a speed of Mach 1. When adiabatically and isentropically converged and then diverged, the pressure and temperature of the wet gas feedstock 110 drop in exchange for an increase in velocity, allowing the vaporous fluids (e.g. water vapor) to condense.

When the system is in a transient phase from startup to steady state (often a system compressor will be intermittent, on and off) Mach will be less than 1. However, even with the system Mach less than 1, the de Laval nozzle 708 does some amount of work as long as there is gaseous flow. Thus, although the intent of the de Laval nozzle 708 is to exceed Mach 1 and gain efficiency, the system can function at a lesser capacity with Mach less than 1. Some embodiments may therefore not accelerate the wet gas feedstock to a supersonic speed—i.e., Mach 1 or greater—and operate with less efficiency.

Note that the ingress port 710 and de Laval nozzle 708 form, by way of example and illustration, but one ingress means. The ingress means is disposed at the bottom end of the shell for: ingressing a wet gas feedstock including a plurality of gaseous mixtures, a plurality of condensable vapors, and a liquid to the separating chamber; adiabatically and isentropically converging the wet gas feedstock as the wet gas feedstock ingresses; accelerates the adiabatically and isentropically converged wet gas feedstock, including condensing the condensable vapors to condensed vapors; and directs the accelerated feedstock into the separating baffles to separate the gaseous mixtures and condensed vapors and the liquid. Other embodiments may employ other means having equivalent structure while performing the recited function.

Returning to FIG. 1, in the illustrated embodiment, the separator 100 is installed as a branch off the flow line 105 from the gas well. The liquefied gas forms a wet gas feedstock 110 and is pushed into the separator 100 by the pressure of the flow line 105. The wet gas feedstock 110 is then accelerated into the separator 100 by the wet gas feedstock ingress 700, shown in FIG. 7A, and through the separating baffles. The acceleration condenses the vapors.

By passing this wet gas feedstock 110 through the separator 100, the separating baffles (i.e., the permeable flow barriers 230, 235, 240, shown in FIG. 2) remove free liquids and sediments in the stream as represented by the arrow 125. The separated liquid and sediment 130 drained from the separator 100. The force of the flow in the flow line 105 and the acceleration through the wet gas feedstock ingress 700, shown in FIG. 7A, the clean dry gas 120 is pushed out the top end 225 to run instruments and other equipment (not shown) without the corrosive liquid or damaging sediments. The process then repeats itself for continuous, maintenance-free operation.

More particularly, and referring to FIG. 1-FIG. 2, the wet gas feedstock 110 is flowing under pressure through the flow line 105 as was mentioned above. This pressure forces a portion of the wet gas feedstock 110 up and into the separator 100 through a port (not yet shown). The pressure furthermore forces the wet gas feedstock 110 through the barriers 230, 235, 240 and the gap 245. The shape of the shell 200 of the separator 100 naturally creates the Bernoulli effect in conjunction with the permeable barriers 230, 235, 240 and air gap 245, which create an enhanced separation of the free liquids and particulates.

The Bernoulli effect in conjunction with the barriers 230, 235, 240 operates differently on the constituent gas, free liquid, and particulates in the wet gas feedstock 110. They help create different velocities among the constituents that separates the gas from the free liquid and particulates A portion of the condensed and separated liquids will pool on a mesh above the baffles and be drained through the first water egress 605 (shown in FIG. 6) off the side of the separator 100 towards the top 225. Separated liquids falling through the separating baffles (e.g., the permeable flow barriers 230, 235, 240) can be drained through the second liquid egress 705 (shown in FIG. 7A) at the bottom 220 of the separator 100. Since the separated liquids are not returned to the line, in embodiments where multiple separators are employed in parallel, this helps avoid ever wetter feedstock as separators operate on the feedstock.

The separated liquids, once drained from the separator 100, may be dumped to a liquid repository (not shown). The continuity between the first liquid egress 605 and the second liquid egress 705 serves as a recirculatory system to draw the separated liquids into the liquid repository. Thus, the first liquid egress 605 and the second liquid egress 705 may be characterized as "recirculatory egress dumps" in at least some embodiments.

The sizes of the openings in the filtering media, the nature of the filtering media, and the placement of the filtering media (i.e., the barriers 230, 235, 240) are determined for this application so that the separator 100 delivers the most efficiently clean and dry gas as tested. By adjusting the sizes of the openings, the nature of the media, and placement of the media, the separator 100 can be used in any liquid/sediment pressurized flow line that requires the operation of instruments or equipment from a source of pressurized gas or air.

Figure 8:
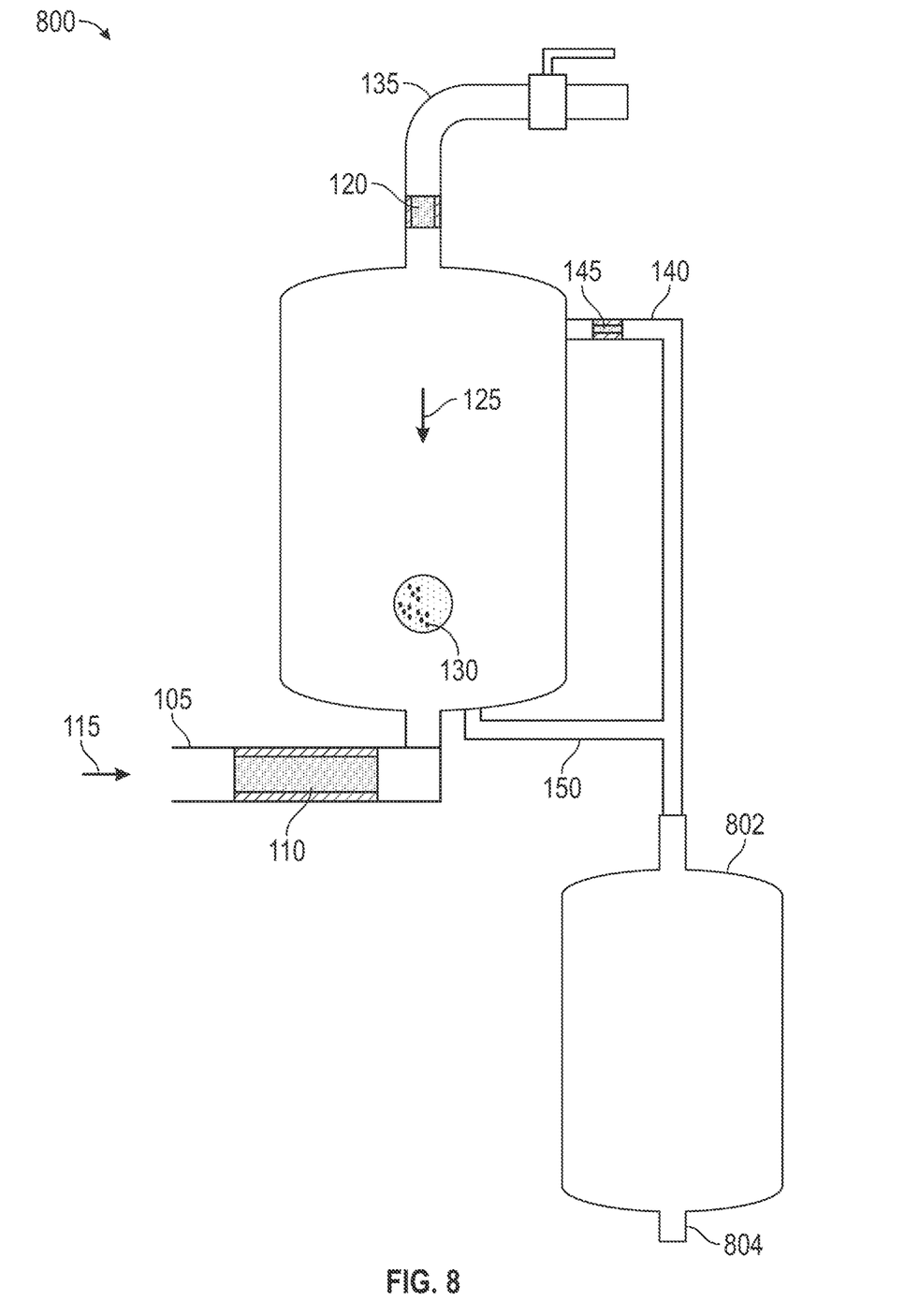
FIG. 8 conceptually illustrates one particular embodiment in which the liquid drained through a first liquid egress and a first separated liquid line and through an optional second liquid egress and an optional second separated liquid line feed a single repository.

FIG. 8 conceptually illustrates one particular embodiment 800 in which, as discussed above, the liquid drained through the first liquid egress (not shown) and the first separated liquid line 140 and through the optional second liquid egress (also not shown) and optional second separated liquid line 150 feed a single repository 802. The repository 802 is, in this embodiment, an exterior reservoir. However, other embodiments may implement the repository 802, for example, a dump valve that is not shown. The separated liquid may be withdrawn from the repository 802 for recirculation. For instance, the separated liquid may be withdrawn from the repository 802 through a drain 804.

Figure 9:
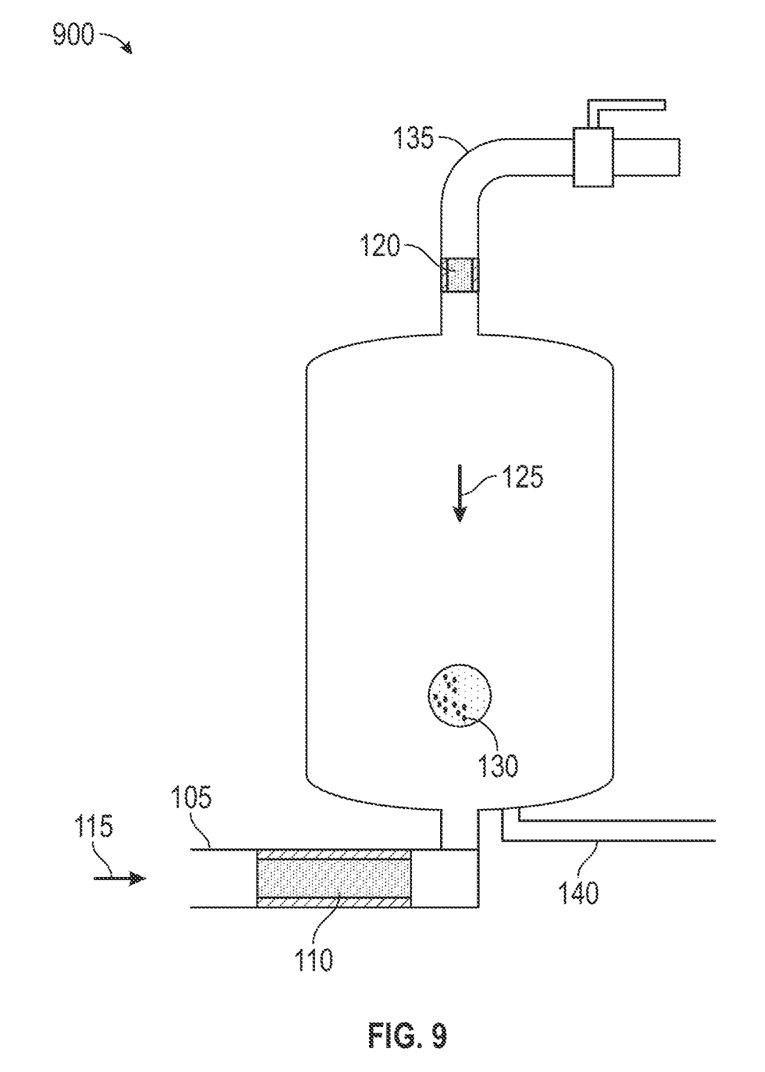
FIG. 9 conceptually illustrates an embodiment in which a first liquid egress and a first separated liquid line are positioned below a plurality of separating baffles at the bottom of the separator.

FIG. 9 conceptually illustrates an embodiment 900 in which the first liquid egress (not shown) and the first separated liquid line 140 are positioned below the baffles and at the bottom of the separator. In this particular embodiment, the optional second liquid egress and the optional second separated liquid line 150 are omitted. The separated liquid may or may not be deposited in a repository as shown in FIG. 8 depending upon the design constraints of the separator.

It may also be desirable in some embodiments to use multiple separators 100 in some circumstances, either in series or in parallel.

The separator described above and claimed below will remove free liquids and, where present, particulates from a gas stream. By doing so, it delivers clean dry gas to run processing equipment and protect valuable instrumentation and equipment from damage from saltwater or various liquids. It therefore replaces, or at least mitigates, the industry standard approach of providing certain maintenance on or replacing instrumentation and equipment that the separator described herein is designed to protect.

Note also that the disclosed separator is not limited to applications in which the wet gas feedstock originates at a wellhead or a wet gas feedstock containing hydrocarbons. The disclosed separator may be used in many applications in which a liquid may need to be separated from a gas in a wet gas feedstock. Examples of such applications include but are not limited to air compressors (industrial or smaller scale); stripping moisture from storage tanks for hydroscopic liquids (for example: diesel absorbs water and would benefit from having a dried air cap recirculating in the storage vessel, whether the could be on a vehicle, fuel station, or any other containment vessel); and distillation of volatile organic compounds from any gaseous fluid stream (aromatic hydrocarbons, alcohol vapors, or any manner of organic volatile compounds).

There are some terms used herein that may be relative in nature in some respect. Examples include "vertically oriented", "top", "bottom", as well as others. Each of these terms are used in reference to the intended orientation of the separator in its intended use—i.e., as shown in FIG. 1. Furthermore, the technique described herein may be used in separators for a variety of application, including applications that require dry lines on the downside of a compressor that would have condensation.

Furthermore, the phrase "capable of" as used herein is a recognition of the fact that some functions described for the various parts of the disclosed apparatus are performed only when the apparatus is powered and/or in operation. Thus, at times, some embodiments of the apparatus are "capable of" performing the recited functions even when they are not actually performing them—i.e., when they are not in operation.

This concludes the detailed description. The particular embodiments disclosed above are illustrative only, as the disclosed apparatus and method may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the claims. Accordingly, the protection sought herein is as set forth in the claims below.

What is claimed:

1. A gas and liquid separator, comprising:
    a shell adapted to be vertically oriented in use, the shell defining a separating chamber having an interior diameter and having a top end and a bottom end;
    a wet gas feedstock ingress to the separating chamber disposed at the bottom end of the shell, the wet gas feedstock ingress including a de Laval nozzle and the wet gas feedstock including at least one of a plurality of gaseous mixtures, a plurality of condensable vapors, and a liquid;
    a plurality of separating baffles disposed within the separating chamber above the wet gas feedstock ingress to separate the gaseous mixtures from the condensable vapors and liquid;
    a dried gas egress disposed at the top end of the shell for the separated gaseous mixtures above the separating baffles, the dried gas egress including a straw extending into an interior portion of the separating chamber and terminating above the separating baffles; and
    a first liquid egress from the separating chamber above which the dried gas egress is disposed.

2. The gas and liquid separator of claim 1, wherein the first liquid egress is positioned above the separating baffles.

3. The gas and liquid separator of claim 2, further comprising a second liquid egress.

4. The gas and liquid separator of claim 3, further comprising a liquid repository to which the first liquid egress and the second liquid egress dump the separated liquid, wherein a continuity between the first liquid egress and the second liquid egress also serves as a recirculatory system to draw the separated liquids into the liquid repository.

5. The gas and liquid separator of claim 4, wherein the liquid repository is an exterior reservoir.

6. The gas and liquid separator of claim 1, wherein the first liquid egress is positioned at the bottom of the separating chamber.

7. The gas and liquid separator of claim 1, wherein the wet gas feedstock ingress, in operation:
    adiabatically and isentropically converges the wet gas feedstock as the wet gas feedstock ingresses;
    accelerates the adiabatically and isentropically converged wet gas feedstock; and
    directs the accelerated feedstock into the separating baffles.

8. The gas and liquid separator of claim 7, wherein the wet gas feedstock ingress, in operation accelerates the wet gas feedstock to a supersonic speed.

9. The gas and liquid separator of claim 1, wherein the wet gas feedstock ingress differentiates stagnation pressure from static pressure to increase the mass rate of condensation of dispersed gasses in the wet gas feedstock as the wet gas feedstock passes through the wet gas feedstock ingress to the separating chamber.

10. A gas and liquid separator, comprising:
    a shell adapted to be vertically oriented in use, the shell defining a separating chamber having an interior diameter and having a top end and a bottom end;
    a plurality of separating baffles disposed within the separating chamber;
    ingress means disposed at the bottom end of the shell for:
        ingressing a wet gas feedstock including at least one of a plurality of gaseous mixtures, a plurality of condensable vapors, and a liquid to the separating chamber;
        adiabatically and isentropically converging the wet gas feedstock as the wet gas feedstock ingresses;
        accelerating the adiabatically and isentropically converged wet gas feedstock, including condensing the condensable vapors to condensed vapors; and
        directing the accelerated feedstock into the separating baffles to separate the gaseous mixtures from the condensed vapors and the liquid;
    dried gas egress means disposed at the top end of the separating chamber for separated gaseous mixtures to egress from an interior portion of the separating chamber above the separating baffles; and
    a first liquid egress from the separating chamber for the separated liquid.

11. The gas and liquid separator of claim 10, wherein the first liquid egress is positioned above the separating baffles.

12. The gas and liquid separator of claim 11, further comprising a second liquid egress.

13. The gas and liquid separator of claim 12, further comprising a liquid repository to which the first liquid egress and the second liquid egress dump the separated liquid and condensed vapors, wherein a continuity between the first liquid egress and the second liquid egress also serves as a recirculatory system to draw the separated liquids into the liquid repository.

14. The gas and liquid separator of claim 13, wherein the liquid repository is an exterior reservoir.

15. The gas and liquid separator of claim 10, wherein the first liquid egress is positioned at the bottom of the separating chamber and is a second liquid egress.

16. The gas and liquid separator of claim 10, wherein the ingress means includes a de Laval nozzle.

17. The gas and liquid separator of claim 10, wherein the ingress means furthermore differentiates stagnation pressure from static pressure to increase the mass rate of condensation of dispersed gasses in the wet gas feedstock as the wet gas feedstock passes through the wet gas feedstock ingress to the separating chamber.

18. The gas and liquid separator of claim 10, wherein the dried gas egress means includes a dried gas port and a straw extending from the dried gas port into the interior portion of the separating chamber.

19. A method for separating gas from liquid in a wet gas feedstock, the method comprising:

ingressing a wet gas feedstock containing a including at least one of a plurality of gaseous mixtures, a plurality of condensable vapors, and a liquid into a separating chamber, including:

adiabatically and isentropically converging the wet gas feedstock as the wet gas feedstock ingresses;

accelerating the adiabatically and isentropically converged wet gas feedstock, including condensing the condensable vapors to condensed vapors; and directing the accelerated feedstock into separating baffles to separate the gaseous mixtures from the condensed vapors and the liquid;

separating the gaseous mixtures from the condensed vapors and the liquid in the separating chamber;

egressing the separated gaseous mixtures from an interior portion of the separating chamber; and draining the separated liquid and the condensed vapors from the separation chamber.

20. The method of claim 19, wherein draining the separated liquid and condensed vapors includes draining the separated liquids and the condensed vapors from a point in the separation chamber above a separating point.

21. The method of claim 20, wherein draining the separated liquid and condensed vapors includes draining the separated liquids and condensed vapors from the bottom of the separating chamber.

22. The method of claim 19, wherein draining the separated liquid and condensed vapors includes draining the separated liquids from the bottom of the separating chamber.

23. The method of claim 19, further comprising dumping the separated liquid and condensed vapors to a liquid repository.

24. The method of claim 19, further comprising differentiating stagnation pressure from static pressure to increase the mass rate of condensation of dispersed gasses in the wet gas feedstock as the wet gas feedstock passes through the wet gas feedstock ingress to the separating chamber.

* * * * *